United States Patent [19]
Phelps

[11] Patent Number: 6,120,933
[45] Date of Patent: Sep. 19, 2000

[54] SELF-RECHARGEABLE, MEDIUM LEVEL DISCHARGE ELECTROCHEMICAL CELL

[76] Inventor: Calvin E. Phelps, 322 N. Hametown Rd., Akron, Ohio 44333

[21] Appl. No.: 09/166,306

[22] Filed: Oct. 5, 1998

Related U.S. Application Data

[60] Provisional application No. 60/061,706, Oct. 6, 1997.

[51] Int. Cl.[7] .................................................. H01M 10/36
[52] U.S. Cl. .......................... 429/103; 429/101; 429/231.9
[58] Field of Search ................................ 429/231.9, 101, 429/103

*Primary Examiner*—John S. Maples
*Attorney, Agent, or Firm*—Renner, Kenner, Greive, Bobak, Taylor & Weber

[57] ABSTRACT

The present invention provides a rechargeable electrochemical battery cell which has self-charging capabilities. Specifically, the cell comprises two chambers interconnected with a tubing and a valve; each chamber further comprising a top closure, a positive contact disposed through said top closure, a cathode in electrical contact with said positive contact, a liquid metal anode disposed in the chamber at the bottom, a negative contact disposed through the bottom of the chamber and in electrical contact with said liquid metal anode, and a non-aqueous molten salt electrolyte disposed within the chamber. At a first temperature, a first electrochemical reaction occurs within the first chamber between the non-aqueous molten salt electrolyte and the liquid metal anode wherein the cation from the non-aqueous molten salt electrolyte reduces to form the liquid metal anode and the first liquid metal anode becomes the cation in the non-aqueous molten salt electrolyte. The new liquid metal anode and new molten salt electrolyte are transferred to the second chamber and reacted at a second temperature to produce an electrochemical reaction that is the reverse of the first electrochemical reaction. After each reaction, the electrical energy from the reaction is discharged to a load. A method of operating the self-charging, medium level energy density electrochemical cell is disclosed in the invention. Additionally, the self-charging electrochemical cell can be combined with at least one other self-charging electrochemical cell to form a battery bank, the structure and method of operation of which are disclosed herein.

9 Claims, 4 Drawing Sheets

Section b-b

FIG 1

Section b-b
FIG 2

FIG 7

# SELF-RECHARGEABLE, MEDIUM LEVEL DISCHARGE ELECTROCHEMICAL CELL

CROSS REFERENCE TO RELATED APPLICATIONS

The present application claims priority from U.S. Provisional Application Ser. No. 60/061,706 filed on Oct. 6, 1997.

FIELD OF THE INVENTION

The present invention is directed generally to rechargeable electrochemical cells, such as electrical batteries. The invention is directed more particularly to electrochemical cells which are self-charging.

BACKGROUND OF THE INVENTION

Electrochemical cells are generally classified as primary or secondary batteries. The primary classification includes disposable batteries that are discharged once, and are not recharged, such as, dry cells for flashlights. However, many primary type batteries are not discarded, and some parts are renewed or changed each time another single discharge is desired.

The secondary classification includes storage batteries or batteries that are recharged from an external source of electricity after they are discharged. These batteries are designed so that the electrochemical processes are reversible to a high degree, by reversing the direction of current through the battery, drawn from an external source.

It is known within the art to utilize various means to renew the electrolyte(s) and/or the electrode(s) of electrochemical cells, or to recharge them from an external source, but electrochemical cells which are capable of self-charging, utilizing means substantially wholly within the cell, have not heretofore been demonstrated.

Batteries with high discharge capabilities, or high current density, versus cell weight have been designed having non-aqueous molten salt electrolytes, that allow use of highly reactive electrode materials. These materials cannot be used with aqueous electrolytes because of undesirable corrosion or reaction problems.

Molten salts generally have higher electrolytic conductivities than do aqueous electrolytes. Molten salts allow use of more reactive solid metal materials and provide more options in configurations.

Discharge capabilities are conventionally expressed in specific energy units of watt hour per kilogram of electrode or cell weight, or specific power units of watts per kilogram. Discharge capabilities are expressed in amp hours of discharge over an eight hour period. For example, the most common storage battery in use: the six cell, twelve volt, lead/lead-sulfate battery, generally has an eight hour discharge rate around 320 amp hours, or a discharge rate at about 40 amps per hour per battery, or about 6⅔ amps per hour per cell. Generally, this battery produces 30–50 watt hour per kilogram.

A high discharge rate cell is generally considered as having greater than 100 watt hour per kilogram of cell. If electrode weight differences are considered, for example, between the lower reactivity lead material weight of about 700 pounds per cubic foot versus the higher reactivity iron, chromium, or manganese material weights of about 500 pounds per cubic foot, specific energy differences are more apparent between a conventional storage and a high discharge rate battery.

In order to generate medium level discharge rates and have the self-rechargeable feature, it is necessary to have a low electronegativity difference between the reactants at the anode and cathode, and low equivalent weight electrodes, but a high reaction efficiency.

An electrolyte, besides having the characteristic of high electrolytic conductivity to promote high rates of electrochemical reactions for providing medium level discharge rates during operation, must also have very low electronic conductivity or low reactivity to avoid self-discharging by spontaneous chemical reactions at any significant rate during idle periods. While the battery operating temperature may be reduced below the melting point temperature of the salt during idle periods to stop any self-discharging, this time delay to return to the operating temperature for startup may be avoided by selecting compatible materials. Molten salt melting point temperatures have been reduced considerably by blending salts to form eutectic metallic molten salts and also by complexing with various compounds.

Operating an electrochemical cell at an elevated temperature creates problems with regard to suitability of available materials, seal leakage problems as related to cell interconnection corrosion and containment of the reactants, and in the case of liquid electrodes, many other problems, such as, electrode separation and containment of the reactants. These problems, however, are solved by currently available technology, including the use of high temperature microporous electrode separators.

Using known insulation designs, heat loss from the battery that is input to maintain its operating temperature will be negligible.

In order to make efficient use of electrode surface areas and electrolyte, the electrochemical cell, or battery, must be arranged so that electrochemical reactions are evenly dispersed over the total electrode surfaces. Solid electrodes in combination with a high conductivity molten salt electrolyte may allow sufficient electrode gaps so that a microporous separator may not be required to prevent localized electrical shorts due to electrode material shape change, dendriting, or high rates of electrode material migration. However, a metal is appreciably soluble in its own salts and any continuity in electronic conductivity through the electrolyte will necessitate usage of a separator.

Aqueous electrolytes generally increase the numbers of extraneous chemical reactions to maintain a chemical balance and reversible reactions, adding complexity, resistance, and power loss within the cell. Aqueous electrolytes generally limit the available electrode materials because of problems with solubility and corrosion. Also, aqueous electrolytes cause hydrogen gassing problems that may be vented which creates safety considerations, and creates electrical polarization problems on the electrodes that increases cell resistance and loss of cell performance.

The use of low reactant solid electrode materials may cause shape change, dendriting, and material shedding problems because of the special material preparation required to enhance discharge capabilities, such as, use of metal powders, sintered metals, or compound pastes to form electrodes.

Additional limitations of traditional aqueous electrolyte batteries are that the battery is affected by climatic temperature changes that change the reaction rate of the electrochemical reaction which changes the electrical output of the battery, the cells in the batteries are consumed by the electrochemical reaction over time and have to be replaced, and the used battery contains hazardous materials that have to be disposed of in accordance with environmental regulations.

These limitations when combined additionally limit the utility of an electric powered car. The capital cost of the car is increased over the life of the car because the aqueous electrolyte batteries deteriorate and need replaced. Also, the aqueous electrolyte batteries only have a limited charge and need recharged which limits the driving range of the electric car.

SUMMARY OF THE INVENTION

It is therefore an object of the present invention to provide an electrochemical cell having medium level electrical discharge capabilities.

It is a further object of the present invention to provide an electrochemical cell capable of self-charging substantially internally.

It is yet a further object of the present invention to provide an electrochemical cell that is portable.

It is still a further object of the present invention to provide an electrochemical cell for use in powering vehicles, for powering construction equipment, and as a stationary power supply.

It is again a further object of the present invention to provide an electrochemical cell that is minimally affected by climatic changes.

It is another object of the present invention to provide an electrochemical cell that does not produce hydrogen gas during the electrochemical reaction.

It is yet another object of the present invention to provide an electrochemical cell that is not consumed by the electrochemical reaction over time.

It is still another object of the present invention to provide an electrochemical cell to power an engine in an electrical car that reduces the capital cost over the life of the car and provide for a substantially unlimited driving range of said electrical car.

The present invention provides a self-charging electrochemical battery cell which has self-charging capabilities. Specifically, the cell comprises two chambers 2 and 3 interconnected with a tubing that penetrates chambers 2 and 3, said tubing controlled by a valve; each chamber further comprising a top closure, a positive contact disposed through said top closure, a cathode in electrical contact with said positive contact, a microporous separator disposed below said cathode, a holder mounted to the top closure to support said microporous separator and said cathode, a reduced metal disposed in each said chamber, a liquid metal anode disposed in the chamber at the bottom, a negative contact disposed through the chamber and in electrical contact with said liquid metal anode, a gap that is formed below said cathode and above said liquid metal anode, a non-aqueous molten salt electrolyte being disposed within the chamber, a set of stand pipes disposed in chamber 2 only that connect the interior of chamber 2 and said holder and said gap, vents that are disposed through said top closure of each said chamber, a thermowell disposed in each chamber, a heater connection disposed in chamber 3 only, and an inert gas cooling connection disposed through the top closure of chamber 2 only.

The invention also discloses a method of operating the self-charging electrochemical cell comprising discharging and recharging the cell and for transferring the contents of the cell from one chamber to the other to effect discharging and recharging.

The self-charging electrochemical cell can be combined with at least one other self-charging electrochemical cell to form a battery bank. The battery bank is constructed to comprise two internal housings to operate in conjunction with the two chambers of the cell. The battery bank can be operated to open and close the valves on all the cells simultaneously, and can be rotated angularly to transfer the contents from one chamber to the other.

DESCRIPTION OF PREFERRED EMBODIMENTS OF THE INVENTION

The present invention includes a design and method for an electrochemical cell having medium level electrical discharge capabilities, as well as a design and method for an electrochemical cell capable of self-charging. In a preferred embodiment, the present invention is directed to an electrochemical cell having medium level electrical discharge capabilities coupled with self-charging capabilities.

Figure 1:
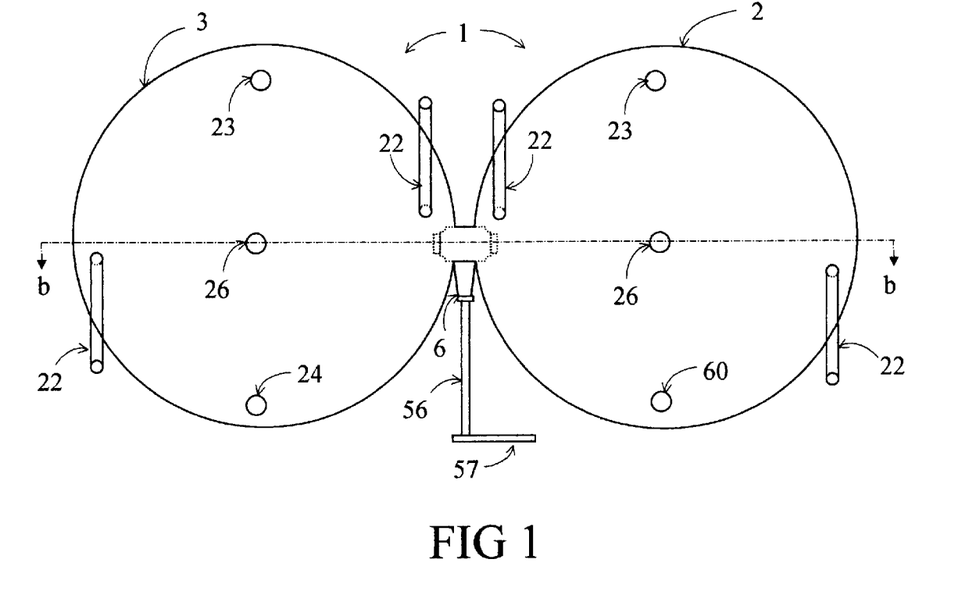
FIG. 1 is a top outside view of the electrochemical battery cell according to the present invention.
Figure 2:
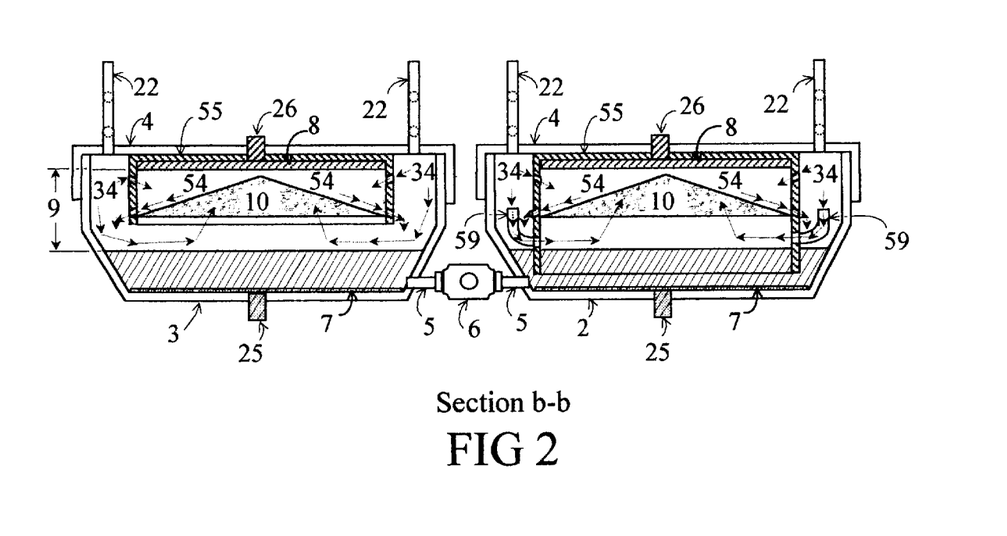
FIG. 2 is a cross-sectional elevational schematic view of the electrochemical battery cell according to the present invention, taken along line b-b of FIG. 1.

Specifically, the present invention provides a self-charging electrochemical cell 1 comprising two chambers, chambers 2 and 3, that are independently housed and insulated from each other. Chambers 2 and 3 are connected by transfer tubing 5 extending from each chamber to a valve 6. Valve 6 has a stem 56 connected to said valve 6 and a handle 57 connected to said stem 56 in the single electrochemical cell 1. Each chamber is preferably cylindrically shaped, conically tapered to a closed bottom and has a top closure 4 to seal the chamber. Within each chamber is a liquid metal anode 7 formed in a disc shape by liquid metal that collects in the bottom of the chamber. The anode contacts a negative contact 25 that extends through the bottom of each chamber, forming the negative terminal of the electrochemical cell. Above the liquid metal anode is a gap 9 that contains a conically shaped microporous separator 10 that allows free passage of cations and anions. Above the conically shaped microporous separator 10 is the cathode 8 and a positive contact 26 that extends through the top of each chamber forming the positive terminal of the electrochemical cell. A holder 55 in each chamber 2 and 3 connected to top closure 4 supports the conically shaped microporous separator 10 and the cathode 8. In chamber 2, the holder 55 extends downward with the bottom of holder 55 terminating below the surface of liquid metal anode 7. Disposed within each chamber and filled in the chamber to top closure 4 is a non-aqueous molten salt electrolyte 34. Stand pipes 59 are disposed in chamber 2 starting between the interior of chamber 2 and holder 55 and terminating below holder 55 under gap 9 to provide a further separation of liquid metal anode 7 from a reduced metal 54.

On the exterior of each chamber 2 and 3 are two vents 22 that pass though the top closure 4 to the interior of each chamber. Disposed into each chamber 2 and 3 is a thermowell 23 that is provided for measuring temperature. An electric resistance heater connection 24 is disposed in chamber 3. In chamber 2, an inert gas purge cooling connection 60 is disposed through top closure 4 to the interior of chamber 2 to provide for a quick lowering of the temperature in chamber 2.

In a separate embodiment, valve 6 and transfer tubing 5 are relocated upwards so that transfer tubing 5 penetrates chambers 2 and 3 near their top elevations above the liquid level of electrolyte 34. To accommodate transfer tubing 5 penetrating chambers 2 and 3 above the liquid level of electrolyte 34, top closure 4 is notched. This eliminates leakage problems that may occur in the seal of valve 6. Additionally, to facilitate gravity transfer when using this embodiment, the sides of chambers 2 and 3 are sloped at a lesser angle from horizontal.

In another embodiment, negative contact 25 does not extend through chambers 2 and 3, but instead is routed upwards through chambers 2 and 3 and penetrates chambers 2 and 3 above the liquid level of electrolyte 34. This eliminates any possible seal leakage problems where negative contact 25 penetrates chambers 2 and 3.

Electrochemical cell 1 chambers 2 and 3, vents 22, transfer tubing 5, valve 6, cooling connection 60, thermowell 23, and heater connection 24 are fabricated from ceramics, refractories, and other suitable materials capable of withstanding the environment.

The cathode 8, negative contact 25, and positive contact 26 can be fabricated from 316 stainless steel, any of the AISI type molybdenum stainless steels (316L, 317, 329, AM-350, and AM-355) and other suitable materials capable of withstanding the environment.

The microporous separator 10 can be fabricated from one of glass woven fibers and ceramics and other suitable materials capable of withstanding the environment.

Figure 6:
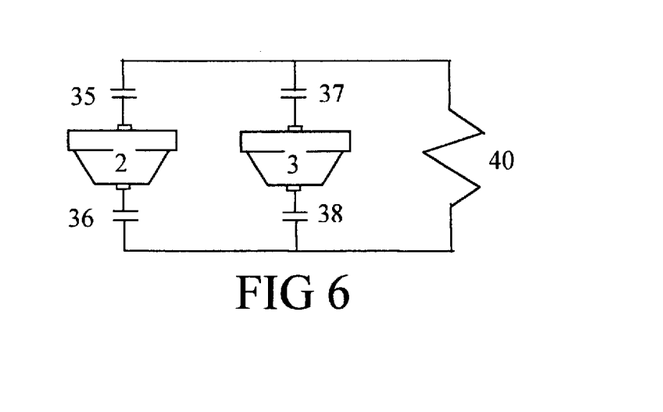
FIG. 6 is an electrical schematic for cell 1 showing the electrical contacts of chambers 2 and 3 connected to a load.

As shown in FIG. 6, electrochemical cell 1 can be connected to a load 40 in a circuit. The circuit is connected to electrochemical cell 1 by an electrical contact 35 connected to positive contact 26 on chamber 2, by an electrical contact 37 connected to positive contact 26 on chamber 3, by an electrical contact 36 connected to negative contact 25 on chamber 2, and by an electrical contact 38 connected to negative contact on chamber 3.

Figure 5:
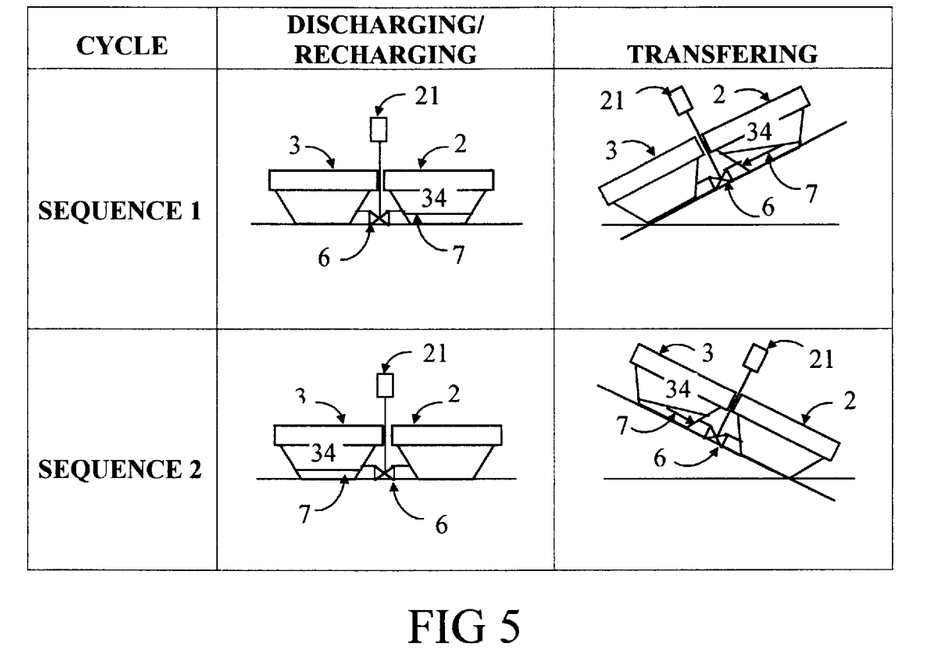
FIG. 5 is a sequential depiction of operating sequences for one discharging-recharging cycle bank according to the present invention.

As shown in FIG. 5, the present invention also provides a method of operating the self-charging, medium level energy density electrochemical cell, including discharging the discharging portion of the cell, comprising closing valve 6, opening electrical contacts 35, 36, 37, and 38, charging chamber 2 with the liquid metal anode 7 and non-aqueous molten salt electrolyte 34, filling chamber 3 through vent 22 with an inert gas, adjusting chamber 2 to an operating temperature, closing electrical contacts 35 and 36 to complete the circuit to load 40 to effect the discharge, and opening electrical contacts 35 and 36 to open the circuit.

As seen in FIG. 5, the method of operating the self-charging electrochemical cell also includes recharging the discharging portion, comprising opening valve 6, tilting chamber 2 side of electrochemical cell 1 up from the horizontal sufficiently to allow the liquid metal anode 7 and non-aqueous molten salt electrolyte 34 to gravity feed from chamber 2 to chamber 3, venting the inert gas from chamber 3, pressurizing chamber 2 with inert gas, closing valve 6, returning electrochemical cell 1 to horizontal, heating chamber 3 to an operating temperature, closing electrical contacts 37 and 38 to complete the circuit to load 40 to effect the discharge, opening electrical contacts 37 and 38 to open the circuit, opening valve 6, tilting chamber 3 side of electrochemical cell 1 up from the horizontal sufficiently to allow liquid metal anode 7 and non-aqueous molten salt electrolyte 34 to gravity feed from chamber 3 to chamber 2, venting the inert gas from chamber 2, pressurizing chamber 3 with inert gas, closing valve 6, and returning electrochemical cell 1 to horizontal.

Figure 3:
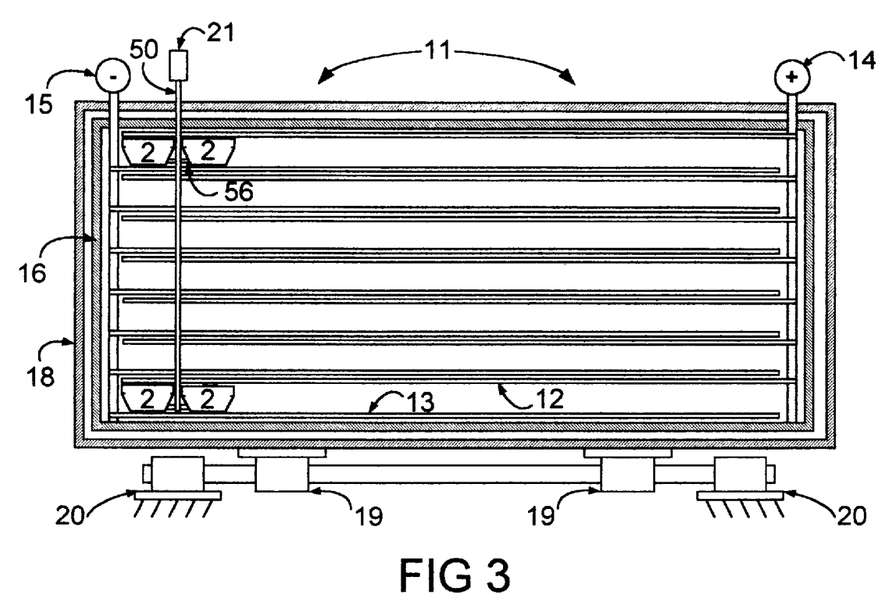
FIG. 3 is a cross-sectional, front view of the battery bank according to the present invention.
Figure 4:
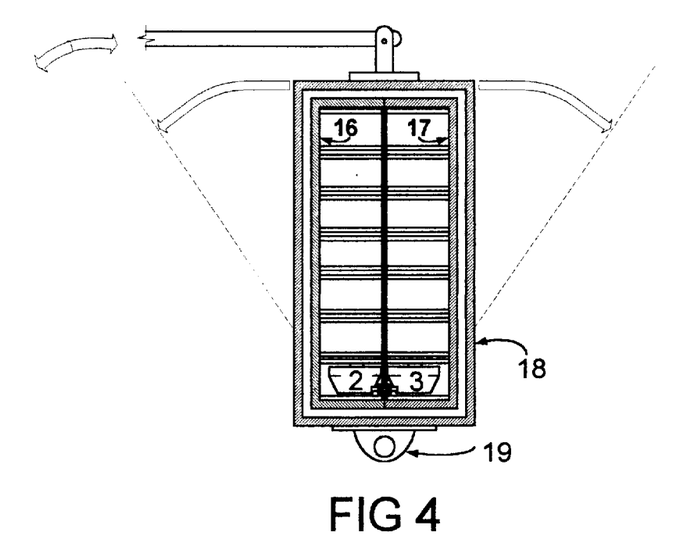
FIG. 4 is a cross-sectional, side view of the battery bank according to the present invention.

Additionally, the electrochemical cell 1 can be combined with at least 1 other electrochemical cell 1 in an exterior housing 18 to form a battery bank 11. Battery bank 11 comprises two separate insulated housings 16 and 17. Chamber 2 of electrochemical cell 1 is disposed in insulated housing 16 and chamber 3 of electrochemical cell 1 is disposed in insulated housing 17. Chambers 2 and 3 of electrochemical cell 1 are rigidly fixed with respect to each other by a top electrical grid support 12 and bottom electrical grid support 13. Said top electrical grid supports 12 are in contact with said positive contacts 26 and attached to the interior sides of insulated housing 16 and insulated housing 17. Said bottom electrical grid support 13 is in contact with said negative contacts 25 and attached to the interior sides of insulated housing 16 and insulated housing 17. The handles 57 of each electrochemical cell 1 is connected to a mechanical linkage 50, and said mechanical linkage 50 is connected to a moving means such as an actuator 21 which operates all valves 6 in a column simultaneously. A positive terminal 14 is disposed in battery bank 11 and connected to said top electrical grid supports 12. A negative terminal 15 is disposed in battery bank 11 and connected to said bottom electrical grid supports 13. The exterior housing 18 has bearing supports 19 connected to the bottom of the exterior housing 18 at each end. Bearing supports 19 are shaft connected to fixed bearing supports 20. A lever arm attachment 65 is mounted to the top center of exterior housing 18. A lever arm 66 is pivotally connected to the lever arm attachment 65.

Additionally, battery bank 11 can be fitted with a leveling device to keep battery bank 11 leveled when being transported up or down a slope when used in a portable application. Preferably, battery bank 11 is leveled front to rear in the direction of the slope to minimize side to side imbalances that could develop.

The method of operating battery bank 11 comprises a) applying a mechanical force, pneumatic or by electric motor, to actuator 21 to engage mechanical linkage 50 to operate valve 6 through handle 57 and stem 56 to open valve 6; b) applying a mechanical force, pneumatic or electric motor, to lever arm 66 to angularly pivot exterior housing 18 about bearing support 19 to the interior housing 17 side direction sufficiently from vertical to allow gravity to drain the liquid metal anode 7 and nonaqueous molten salt electrolyte 34 from chamber 2 to chamber 3; c) applying a mechanical force, pneumatic or by electric motor, to actuator 21 to engage mechanical linkage 50 to operate valve 6 through handle 57 and stem 56 to close valve 6; d) applying a mechanical force, pneumatic or by electric motor, to lever arm 66 to angularly pivot exterior housing 18 about bearing support 19 back to vertical; e) discharging chamber 3; f) applying a mechanical force, pneumatic or by electric motor, to actuator 21 to engage mechanical linkage 50 to operate valve 6 through handle 57 and stem 56 to open valve 6; g) applying a mechanical force, pneumatic or by electric motor, to lever arm 66 to angularly pivot exterior housing 18 about bearing support 19 to the interior housing 16 side direction sufficiently from vertical to allow gravity to drain the liquid metal anode 7 and non-aqueous molten salt electrolyte 34 from chamber 3 to chamber 2; h) applying a mechanical force, pneumatic or by electric motor, to actuator 21 to engage mechanical linkage 50 to operate valve 6 through handle 57 and stem 56 to close valve 6; and i) applying a mechanical force, pneumatic or by electric motor, to lever arm 66 to angularly pivot exterior housing 18 about bearing support 19 back to vertical, ready for discharge of chamber 2.

In a separate embodiment, valve operator 21 and mechanical linkage 50 are replaced with a cam operation. The cam is rotationally mounted to the end of exterior housing 18 and is connected to a fixed arm. The cam is connected through the exterior housing 18 to a mechanical linkage, a cam follower, that is connected to valves 6. During the method of operating the battery bank when exterior housing 18 is angularly pivoted, the rotation of the cam will open and close valves 6.

In another embodiment, to facilitate maintenance of chambers 2 and 3 during a battery bank shutdown or when the battery bank is idle, a third chamber is added at the same elevation as chambers 2 and 3 to hold and protect electrolyte 34 and liquid anode 7. During this shutdown, electrolyte 34 and liquid anode 7 are drained into this third chamber. The third chamber is equipped with an electric resistance heater, a temperature measuring device, inert gas cooling purge, and an inert gas blanket to maintain the temperature of electrolyte 34 and liquid anode 7. Similarly to chambers 2 and 3, the third chamber is connected to chambers 2 and 3 with transfer tubing 5 connected to a valve 6. Valve 6 can be actuated with an actuator 21 or a cam as described above. Additionally, the transfer into the third chamber from chambers 2 and 3, the transfer from the third chamber to chambers 2 and 3, and the temperature control of the third chamber can be controlled by the control scheme described below.

The non-aqueous molten salt electrolyte 34 consists of metallic cations 44 and acid anions 45. It is desirable to select salts from relatively abundant, economical, and environmentally friendly materials with low melting point temperatures. The metallic cations can be selected from metal materials such as, but not limited to, tin, zinc, cadmium, lithium, lead and bismuth. Representative anions include, but are not limited to, halide ions such as fluoride, chloride, bromide and iodide.

It is desirable to select salts with a melting point temperature near or below the melting point temperatures of the metals that will be reduced from the cations, so that the cell may operate at a low temperature. The salt must have good stability and a significantly higher boiling point and decomposition temperature than the cell operating temperature. The non-aqueous molten salt electrolyte most preferably is not reactive with electrical contacts 25 and 26.

The operating densities for liquid metal anode 7, reduced metal 54, and cation 44 must be determined and compared to the operating density of non-aqueous molten salt electrolyte 34. The density of liquid metal anode 7 and reduced metal 54 must be greater than the density of the non-aqueous molten salt electrolyte 34 for electrochemical cell 1 to function. If the density of liquid metal anode 7 is greater than reduced metal 54, liquid metal anode 7 must be installed in chamber 2 because reduced metal 54 will float on the surface of liquid metal anode 7 and decrease the discharge efficiency.

The holder 55 in chamber 2 extends downward and terminates below the surface of liquid metal anode 7 to provide a separate holding compartment for reduced metal 54 as it flows from cathode 8 to the bottom of chamber 2. In chamber 3, holder 55 does not extend below the surface of liquid metal anode 7 because the discharge efficiency in chamber 3 is enhanced with higher density reduced metal 54 flowing to a lower level and providing buoyancy for liquid metal anode 7 so that it is maintained at a similar discharge gap through its operating cycle.

Individual chemical cells 1 or battery banks 11 can be connected electrically in series or in parallel to achieve a desired voltage and current for a given application.

Inert gas that can be used in this invention comprises nitrogen, argon and the like.

Figure 7:
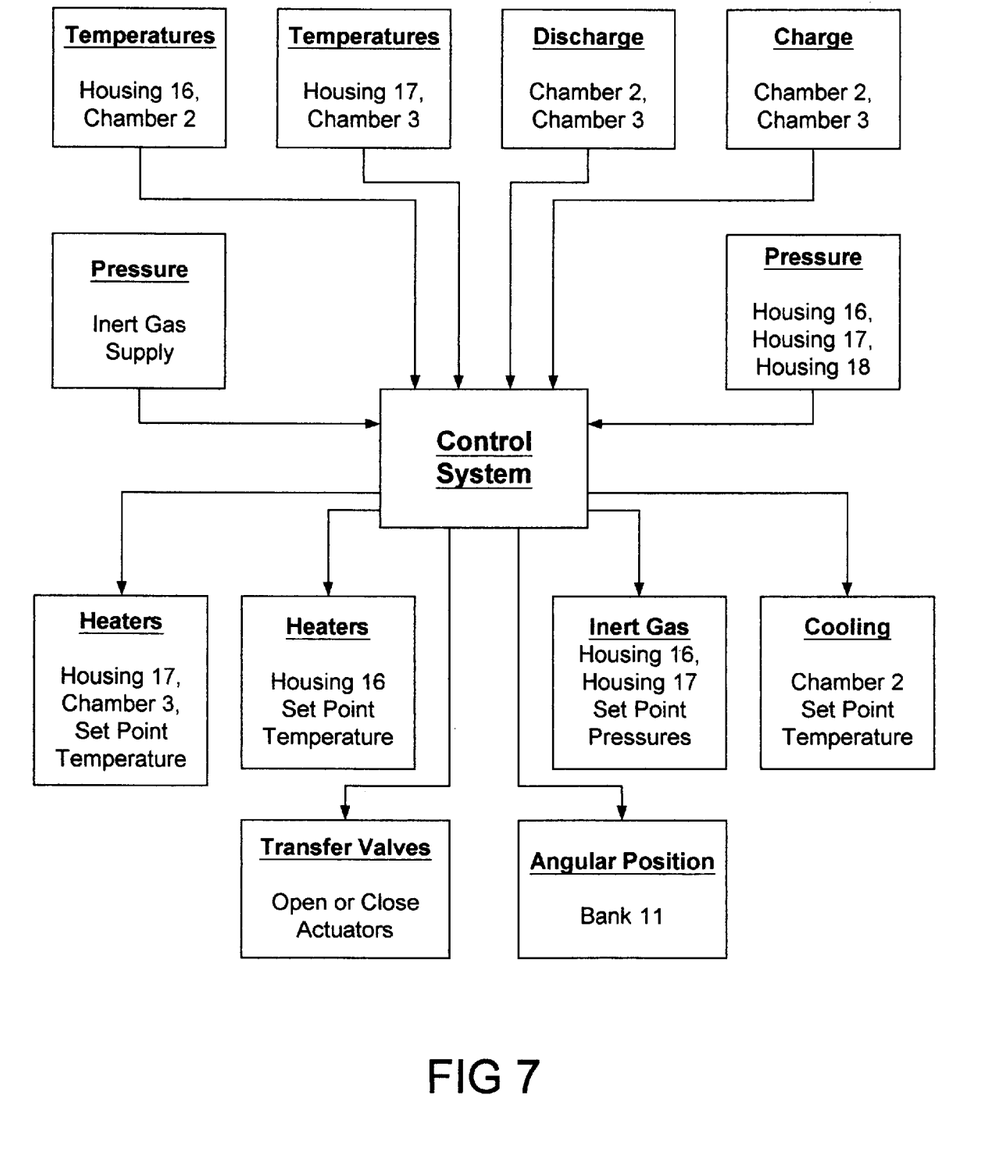
FIG. 7 is a block diagram of the control system bank according to the present invention.

The operation of electrochemical cell 1 and battery bank 11 can be controlled by a control system as illustrated in FIG. 7. Inputs to the control system comprise temperature readings from thermowells 23 in chambers 2 and 3, temperature readings from insulated housings 16 and 17, pressure of the inert gas supply, pressure readings from insulated housings 16 and 17, pressure reading from external housing 18, and the charging and discharging status of chambers 2 and 3. The charging and discharging status of chambers 2 and 3 indicate the current cycle status of electrochemical cell 1.

The output of the control system may control heaters in chamber 3 and insulated housings 16 and 17, pressure of the inert gas in chambers 16 and 17, the cooling of chamber 2 with the inert gas, the actuator that opens and closes valve 6, and the angular positioning of battery bank 11. Additionally, the control system can be configured with feed forward programs to provide for faster and more accurate control system responses.

A battery bank of electrochemical cells provides stationary or portable power. This portable power can be used to power equipment anywhere power is needed and is not available.

Because the battery bank housing is insulated, it is not impacted by climatic temperature changes as are standard batteries in which the reaction rates change as the temperature changes. Additionally, these electrochemical cells outlast traditional aqueous electrolyte batteries because the battery does not deteriorate over time as does aqueous electrolyte batteries in which the electrodes have a limited number of operating cycles. This is an environmental consideration as compared to the disposal of the hazardous materials from an aqueous electrolyte battery.

Also this battery bank of electrochemical cells does not produce hydrogen gas during its reaction. Hydrogen gas is flammable and increases the hazards of operating an aqueous electrolyte battery.

These combined advantages for a battery bank of electrochemical cells makes an excellent choice for the power system for the engine in an electric car. Currently, electric cars use aqueous electrolyte batteries for power. However, these batteries are consumed over time and have to be replaced which is a large capital cost. Also, this battery bank of electrochemical cells is self-rechargeable. This permits an electric powered car to have a substantially unlimited driving range.

It will be appreciated that the electrochemical series will be different in different molten salts and may change the series with changes in operating temperature. Final selection of compatible materials for a particular molten salt design may be determined by those skilled in the art without undue experimentation.

EXAMPLE

Solubility is an important consideration when selecting salts and anode materials. Generally a metal is somewhat soluble in its salt. Some displacement solubility will occur between liquid metal anode 7 and non-aqueous molten salt electrolyte 34 because of electrochemical cell 1 design. However, since the two metals selected, i.e., one for liquid metal anode 7 and the other in non-aqueous molten salt electrolyte 34 as cation 44, are selected from the electromotive series based on their reversibility at different temperature levels, these metals will be close together in the electromotive series order and self discharging will generally be minimal. Since cadmium is selected for liquid metal anode 7 and it is denser than tin at operating temperatures, chamber 2 will be filled first.

The Molten Salts Handbook (1967) shows that cadmium is more electropositive than tin in pure chlorides at 700° C. and cadmium will therefore displace tin at this temperature level. Also, this Handbook shows that tin is more electropositive than cadmium in pure chlorides at 800° C. and tin will therefore displace cadmium at this temperature level.

Electrical contacts 35, 36, 37, and 38 are open so that external circuitry to load 40 is open. Chamber 2 is ready for discharge at 700° C. operating temperature after an electromotive force, or potential, has developed between liquid metal anode 7 and cathode 8. When electrical contacts 35 and 36 are closed, chamber 2 is connected to load 40 and the following electrochemical reaction occurs to cause 0.2 volts potential (from Molten Salts Handbook, 1967) between liquid metal anode 7/negative contact 25 and cathode 8/positive contact 26 connections of chamber 2:

$$Cd + Sn^{++}Cl_2^- \rightarrow Cd^{++}Cl_2^- + Sn\downarrow$$

Liquid cadmium anode 7 oxidizes, or ionizes, to discharge electrons through the external wiring, through load 40, and back to cathode 8. Cathode 8 acts as a current collector for the negatively charged electrons which draws the oppositely charged tin cations 44 that collect electrons to reduce to form atoms of tin metal 54. The chloride anions 45 of the non-aqueous molten salt electrolyte 34 are drawn to the oppositely charged cadmium ions to form an electrovalent bond and then melt to form electrolyte of cadmium chloride since electrochemical cell 1 is operating above its melting point temperature. Thus, the electrochemical circuit is complete to cause continuation of the cell action until cadmium anode 7 or tin chloride electrolyte 34 are unavailable. Tin atoms 54 melt and gravity drain to the microporous separator 10 and then to the outside compartment formed by holder 55. Tin metal 54 flows to its segregated chamber and floats on cadmium anode 7 and forces cadmium anode 7 level upwards in the center compartment to discharge at nearly the same gap 9 through its discharge cycle.

After chamber 2 has discharged and electrochemical cell 1 is disconnected electrically from load 40 by opening contacts 35 and 36, the chamber 2 liquid contents are drained into chamber 3. Electric resistance heater 24 may be used to more rapidly arrive at operating temperature in chamber 3. Also, insulated housing 17 may be operating at a higher offset temperature set point just prior to transfer to more rapidly arrive at operating temperature. When chamber 3 is operating at 800° C., tin will displace cadmium from its salts. On open circuit to load, a potential develops between tin anode 7 and cathode 8. Load 40 is connected to chamber 3 by closing contacts 37 and 38, and the following electrochemical reaction occurs to develop about 0.07 volts potential (from Molten Salts Handbook, 1967) between liquid metal anode 7/negative contact 25 and cathode 8/positive contact 26 connections of chamber 3:

$$Sn + Cd^{++}Cl_2^- \rightarrow Sn^{++}Cl_2^- + Cd\downarrow$$

Tin anode 7 ionizes to pass electrons through the external wiring, through load 40 and back to cathode 8. The positively charged cadmium cations are drawn to the oppositely charged electrons at cathode 8 to collect them and reduce to cadmium atoms 54. Chloride anions 44 are drawn to tin cations 45 to electrovalently bond and melt to form electrolyte 34. Thus, the electrochemical circuitry is complete to cause continuation of the cell reactions until tin anode 7 or cadmium chloride electrolyte 34 are unavailable. The cadmium atoms 54 melt and drain to the top of microporous separator 10 and then to the bottom of cell 1. Cadmium 54 forces anode 7 tin metal to discharge at the same level, or at the same gap 9, since tin floats on cadmium 54. Chamber 3 is electrically disconnected from load 40 by opening contacts 37 and 38. When the liquid contents of chamber 3 are drained to chamber 2, one complete reversible cycle has occurred. Inert gas purge cooling connection 60 may be used on chamber 2 to more rapidly reduce temperatures to operating temperature. The cycles may be continued as required.

In this example, the potential of chamber 3 results in 0.07 volts. If this potential requires that gap 9 dimension be less than the available space requirement for separator 10, consideration will be given to not using a separator in chamber 3 for portable battery applications. Without separator 10, electronic shorting in chamber 3 from liquid metal anode 7 to cathode 8 may be avoided by modifying holder 55 so that it does not have the side drills for passing electrolyte 34 or reduced metal 54. This feature will inhibit electronic shorting by shielding liquid metal anode 7 and by temporarily forcing some liquid metal anode 7 to flow into vent 22 during greater level upsets. Battery bank 11 can be included with a leveling feature to inhibit level upsets.

If separator 10 is insufficiently sloped to provide adequate gravity draining of reduced metal 54, an inert gas drain assist may be installed. The inert gas is introduced through holder 55 and exits through several angled nozzles directed along the upper surface of separator 10. Pulses of inert gas properly directed at reduced metal 54 will force its flow off the upper surface of separator 10.

As a general assumption, frequently used molten salt batteries are not considered to have an energy efficiency penalty for heat loss through the insulation jacket since the normal energy dissipation that occurs in all batteries during operation, may equal or exceed the energy passing through the insulation. Current insulation technology can insure minimal heat loss from these batteries.

An energy penalty may be applied to this technology for thermal energy that is added to chamber 3 after the contents of chamber 2 have been transferred to it at a lower temperature. This added thermal energy is dissipated when the contents of chamber 3 are transferred back to chamber 2. Therefore, this energy penalty is applied for each discharge-recharge cycle. If this heat was dissipated in another combined cycle, such as a space heater or other required energy device, this energy penalty could be minimized. However, calculations are given below to show that even taking this full energy penalty results in a high net power output from electrochemical cell 1.

Calculations for net power outputs includes the following assumptions:

Cathode 8 is an inert, redox electrode and reduced metal 54 will gravity drain off its clean surface to cause little resistance as compared to other cells that may accumulate the reduced compound and create resistance.

Liquid metal anode 7 is liquid metal and salt produced at its surface during oxidation melts to form electrolyte which results in a clean anode surface as compared to other cells that may accumulate a compound to create resistance.

Non-aqueous molten salt electrolyte 34 is installed with 10% excess capacity in regard to material mass balances and concentration polarization is negligible. Other types of polarization are negligible.

Microporous separator 10 freely passes anions and cations without creating resistance.

Power to operate controls and operators is negligible.

Heat loss through insulation is negligible.

Based on above assumptions, and since cathode 8 is inert and maintains the cell electromotive force, the calculations assume that liquid metal anode 7 is 100% chemically reactive and all atoms are oxidized as intended.

On a per cell basis, approximate calculations are given below for theoretical specific energy, expressed as Watthour/kilogram, and for power output, expressed as Watt-hours, using the same materials as selected for the above Example. Total weight of liquid metal anode 7, cathode 8, and non-aqueous molten salt electrolyte 34 is 630 grams.

Cell 1 chamber 2:
1. Cadmium density=8 grams per $cm^3$ (estimated from Handbook of Chemistry and Physics)
2. Volume of anode=25.5 $cm^3$ (based on 3¼ inch diameter by 3/16 inch thick disc)
3. Cadmium anode weight=25.5 $cm^3 \times 8$ g/$cm^3$=204 grams
4. Number cadmium moles=204 g/112.41 g/g-mole=1.82 (where 112.41 g/g-mole=Molal Mass)
5. Number cadmium atoms=1.82 moles$\times 6.022 \times 10^{23}$/mole= $10.96 \times 10^{23}$ (where, $6.022 \times 10^{23}$/mole=Avogadro's Number)
6. Number electrons donated by cadmium oxidation= Number atoms×Valence= $10.97 \times 10^{23} 2 = 21.92 \times 10^{23}$
7. Cadmium Coulombs=$(21.92 \times 10^{23})(1.591 \times 10^{-9})$=348,748 (where $1.591 \times 10^{-9}$=one electron coulomb charge)
8. Capacity=348,748 Coulombs/3600 seconds/hour=96.9 Amphours (where 1 coulomb/second=1 amp)
9. Chamber 2 EMF=0.2 volts (from Molten Salts Handbook, 1967)
10. Specific energy=96.9 amp hours×0.2 volts/0.63 kg=30.8 Watthour/kg
11. Chamber 2 power output=97 amp hours×0.2 volts=19.4 Watt-hours Cell 1 chamber 3:
12. Number tin atoms=$10.96 \times 10^{23}$ (same number of oxidized cadmium atoms in chamber 2)
13. Number electrons given up during tin oxidation=$21.92 \times 10^{23}$
14. Tin Coulombs=348,748
15. Capacity=96.9 Amp hours
16. Chamber 3 EMF=0.07 volts (from Molten Salts Handbook, 1967)
17. Specific energy=96.9 Amp hours×0.07 volts/0.63 kg=10.8 Watt-hour/kg
18. Chamber 3 power output=6.8 Watt-hours Power to heat electrolyte and tin anode materials after transfer from chamber 2 to chamber 3 to increase temperature from 700° C. to 800° C. (Calculations assume all electrolyte is cadmium chloride since the density, specific heat, and molal mass of tin chloride are approximately the same values as cadmium chloride.):
19. Cadmium chloride density=4 g/$cm^3$ (estimated from Molten Salts Handbook, 1967)
20. Electrolyte volume=95 $cm^3$
21. Electrolyte weight=density×volume=380 grams
22. Number moles cadmium chloride=380 g/183.3 g per g-mole=2.07
23. Electrolyte specific heat=24 calories/degree mole (estimated from Molten Salts Handbook, 1967
24. Heat for electrolyte=(2.07 moles)(24 calories/degree mole)100=4968 calories
25. Number tin moles=Number atoms(from 12. above)/ Avogadro's Number=1.8
26. Tin specific heat=6.5 calories/degree mole (estimated from Handbook of Chemistry and Physics)
27. Heat for tin anode=(1.8 moles)(6.5 calories/degree mole) 100=1,170 calories
28. Total heat=4,968 calories+1, 170 calories=6,138 calories=24.4 BTU (where 1 BTU=252 calories)
29. Total power to heat=24.4 BTU/3.413 BTU per watt hour=7.1 watt-hour (where 1 watt=3.413 BTU/hour)

Net Power Output:
30. Chamber 2(# 11.)+Chamber 3(#18.)–Power to Heat (#29.)=19.1 Watt-hours Net Specific Energy:
31. Chamber 2(#10.)+Chamber 3 (#17.)–Heating power/kg (#29./0.63 kg)=Net Specific Energy=30.3 Watt-hour/kg Power to heat anode 7 and electrolyte 34 from 700° C. to 800° C., after transferring from chamber 2 to chamber 3, is a little more than the power output of one recharge cycle from chamber 3. Therefore, the power output from chamber 2 is about 98.5% available.

Cell 1 theoretical net specific energy of 30.3 Watt-hour/kilogram is approximately equivalent to the actual performance of the conventional lead acid battery as may be referenced in publications, such as, "Fundamentals of Electrochemical Science" Keith B. Oldham and Jan C. Myland, Academic Press, Inc., Copyright 1994.

By substituting lead for cadmium in anode 7 and tin iodide for tin chloride in electrolyte 34, the Molten Salts Handbook data shows that chamber 2 and 3 may be operated at 500° C. and 700° C., respectively; however, cell 1 net specific energy would result in about 14 Watt-hour/kilogram.

Thus, the objects of the invention are accomplished by the present invention, which is not limited to the specific embodiments described above, but which includes variations, modifications and equivalent embodiments defined by the following claims.

I claim:

1. A self-charging electrochemical cell comprising a first chamber and a second chamber, each having a bottom, interconnected with a tubing that penetrates the first chamber and the second chamber, said tubing controlled by a valve; each first and second chamber further comprising a top closure, a positive contact disposed through said top closure, a cathode in electrical contact with said positive contact, a microporous separator disposed below said cathode, a holder mounted to the top closure to support said microporous separator and said cathode, a negative contact disposed through the chamber, a gap, vents that are disposed through said top closure of the chamber, and a thermowell disposed in the chamber; a set of stand pipes disposed in the first chamber only that connect the interior of the first chamber and said holder and said gap, a heater connection disposed in the second chamber only, and an inert gas cooling connection disposed through the top closure of the first chamber only; at least one of the first chamber and the second chamber further comprising a liquid metal anode disposed within the chamber at the bottom, a non-aqueous molten salt electrolyte being disposed within the chamber, and a reduced metal disposed within the chamber; wherein the negative contact is in electrical contact with said liquid metal anode, and wherein the gap is formed below said cathode and above said liquid metal anode.

2. The self-charging electrochemical cell of claim 1, wherein the tubing is disposed through the first chamber and the second chamber at a level above the electrolyte.

3. The self-charging electrochemical cell of claim 1, wherein the negative contact is disposed through the chamber above the electrolyte.

4. The self-charging electrochemical cell of claim 1, wherein the liquid metal anode has a liquid level, and wherein the holder extends below the liquid level of said liquid metal anode in the first chamber.

5. The self-charging electrochemical cell of claim 1, wherein the positive contact comprises molybdenum stainless steel.

6. The self-charging electrochemical cell of claim 1, wherein the negative contact comprises a material selected from the group consisting of tin, zinc, cadmium, lithium, lead, bismuth, and mixtures and alloys thereof.

7. The self-charging electrochemical cell of claim 1, wherein the non-aqueous molten salt electrolyte comprises cations selected from the group consisting of tin, zinc, cadmium, lithium, lead and bismuth.

8. The self-charging electrochemical cell of claim 1, wherein the non-aqueous molten salt electrolyte comprises anions selected from the group consisting of fluoride, chloride, bromide, and iodide.

9. The self-charging electrochemical cell of claim 1, wherein the inert gas is selected from the group consisting of nitrogen and argon.

* * * * *